Figure 1:
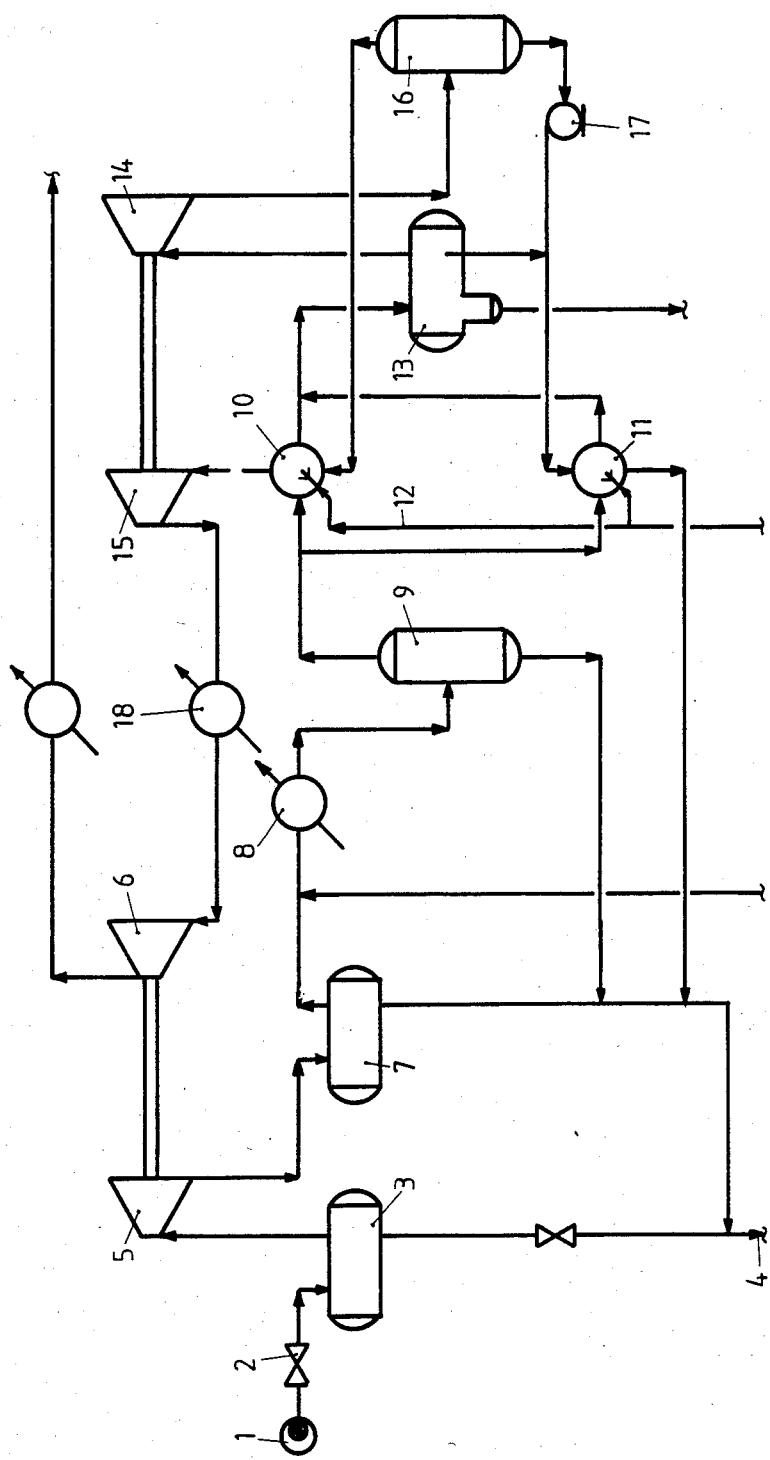

United States Patent [19]
Dobrotwir

[11] Patent Number: 4,645,522
[45] Date of Patent: Feb. 24, 1987

[54] PROCESS FOR SELECTIVELY SEPARATING PETROLEUM FRACTIONS

[76] Inventor: Nicholas G. Dobrotwir, 27 Riverside Ave., N. Balwyn, Melbourne, Victoria, Australia

[21] Appl. No.: 747,303

[22] Filed: Jun. 21, 1985

[30] Foreign Application Priority Data

Jun. 22, 1984 [EP]  European Pat. Off. ........ 84200921.9

[51] Int. Cl.[4] .............................................. F25J 3/00
[52] U.S. Cl. ........................................... 62/18; 62/28; 62/38
[58] Field of Search .................... 62/17, 18, 23, 27, 28, 62/29, 38, 39

[56] References Cited
U.S. PATENT DOCUMENTS

| | | | |
|---|---|---|---|
| 4,155,729 | 5/1979 | Gray et al. | 62/18 |
| 4,453,956 | 6/1984 | Fabbri et al. | 62/29 |
| 4,456,461 | 6/1984 | Perez | 62/28 |

*Primary Examiner*—Ronald C. Capossela

[57] ABSTRACT

Pressure energy in a petroleum reservoir is not wasted, but used for cooling the gas/liquid mixture through expansion in turbo-expanders (5, 6). The power generated thereby is used for recompression of the gas or for other power needs. This saves Freon cooling apparatus, compressors for recompressing the cooling fluid, drive motors and power for driving them (e.g. fuel gas at an off-shore site), space and weight. In an alternative embodiment the process uses stripping-reboiling whereby again the amount of compression may be reduced as well as a higher yield of selected heavy hydrocarbons is obtained.

4 Claims, 3 Drawing Figures

PROCESS FOR SELECTIVELY SEPARATING PETROLEUM FRACTIONS

The invention relates to a process for selectively separating gas and liquid fractions from reservoirs or other hydrocarbon gas/liquid mixtures through expansion in expansion turbines.

A similar process is known from the U.S. Pat. No. 4,155,729. According to that patent gas leaving well head is first cooled in heat exchangers and thereby reduced in pressure before it is subjected to the first expansion stage. The cooling is effected through a cooling fluid, e.g. Freon, which vaporises and has to be recompressed by electrically driven compressors. With well heads on the sea bottom, the power therefore has to be generated at the spot on a platform or an oil recovery vessel, which requires diesel engines and fuel consumption.

The invention aims at saving of total compression horsepower, elimination of supplementary chilling through second stage expansion and reduction of apparatus (weight and surface area) as well as of fuel through making maximal use of the pressure energy present in the reservoir.

This is achieved according to the invention in that the gas is fed through a knock-out vessel without exterior cooling to a first expansion turbine and after condensate separation the vapour is fed to a second expansion turbine, from there is fed to a first compressor, provided on and driven by the shaft of the second turbine, and after compression is fed to a second compressor provided on and driven by the shaft of the first turbine.

The desired hydrocarbon split of the reservoir fluid into gas and liquid fractions may be obtained in that after the expansion stage or stages selective condensate and gas separation is achieved through flash vapourisation and cooling.

It is also possible that after the expansion stage or stages further selective hydrocarbon separation is achieved through a stripper-reboiler stage. Thereby more condensate is obtained after the expansion phase, which, moreover, substantially contains more of the heavy hydrocarbon components and thereby is purer. Additionally, with this alternative embodiment less compression horsepower energy is required to return the light hydrocarbon gas to the gas recompression section of the process.

The invention will be further explained with reference to the accompanying drawings, which show in FIG. 1 a process scheme of a first embodiment of the process according to the invention, and in FIG. 2 the process scheme of a second embodiment according to the invention.

Figure 3:
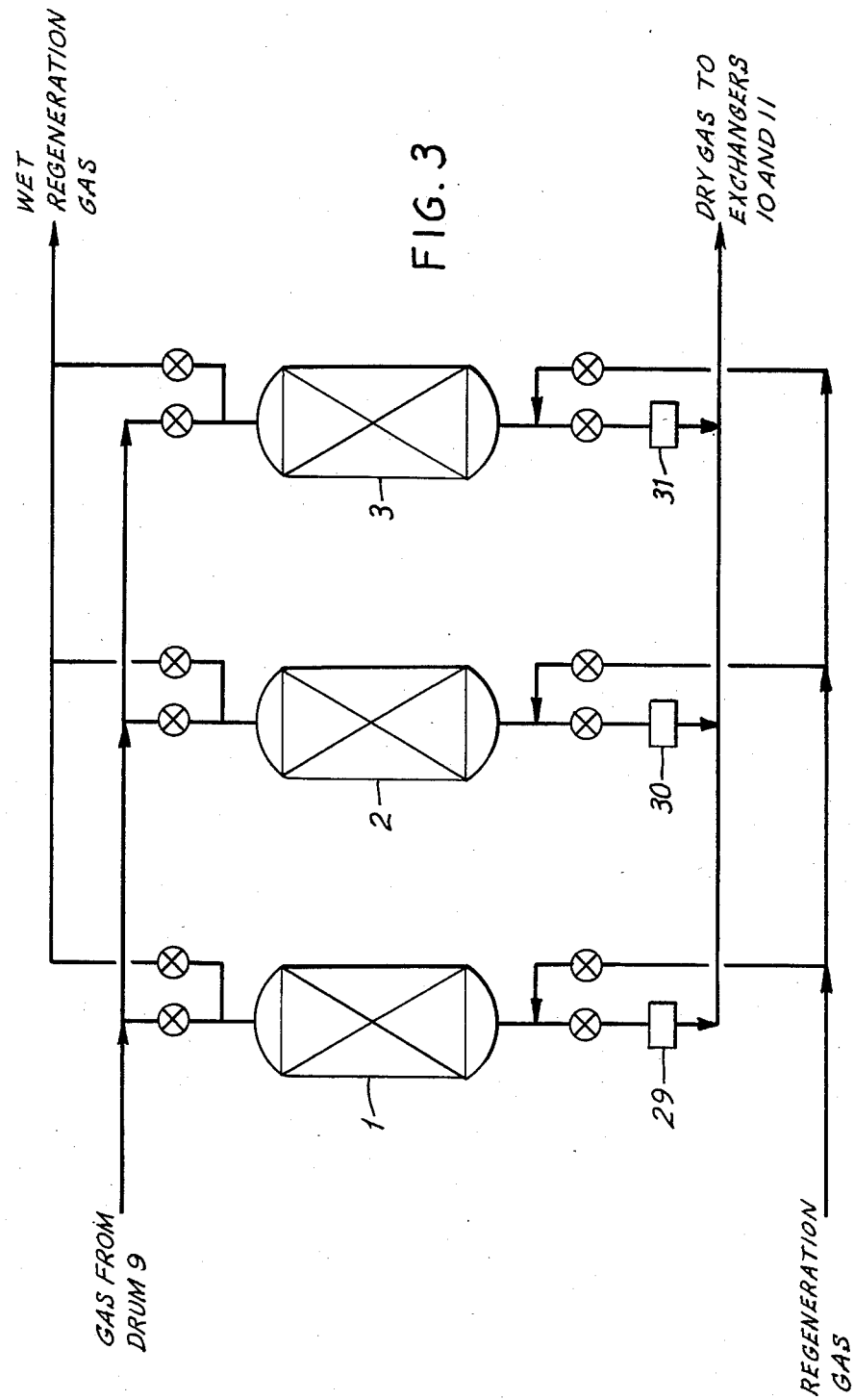

FIG. 3 is a process scheme of molecular sieve dehydrators.

According to FIG. 1 reservoir fluid is fed through a knockout vessel directly from the well head at a pressure of e.g. 22289 kPa through schematically indicated well head 1 and reduced in pressure to about 10.886 kPa across well head choke valve 2.

Condensate is separated from the gas in the inlet gas scrubber 3 and taken to a condensate separator 4. Gas from the inlet gas scrubber 3 is fed into the first expansion turbine 5 and this gas/vapour is expanded therein from 10886 to about 5890 kPa.

Power generated by this turbine is absorbed in a compressor 6 provided on and driven by the expansion turbine 5. Liquid condensed in the expansion turbine (approximately 3 Wt.%) is separated in a drum 7. Liquid is drawn from said drum and led to condensate in separator 4. Vapour separated in the drum 7 is combined with vapour from the stabilizing section of the condensate separator 4, whereafter the combined stream is cooled and partially condensed by heat exchange against cooling water in an exchanger 8. Liquid condensed in heat exchanger 8 is removed in a drum 9 and the separated vapour is further cooled in two parallel exchangers 10 and 11 to approximately $-6°$ C. The condensate from the drum 9 is again led to the condensate separator 4. To avoid ice and hydrate formation at the lower temperatures, glycol is injected into spray rings, located across the tube sheets of both exchangers 10, 11 (only the supply line 12 for the glycol is indicated.)

Alternatively molecular sieves or methanol systems may be used to achieve the desired degree of dehydration. In certain instances the molecular sieve approach is far more effective over methanol or glycol as it:

1. eliminates the glycol and/or methanol make-up and storage inventory.
2. simplifies regeneration equipment thereby reducing maintenance requirements.
3. reduces significantly space requirements.
4. utilises waste heat energy for regeneration.

FIG. 3 depicts a suitable molecular sieve dehydration arrangement for use in the present process wherein three beds 26, 27 and 28 are utilized, two of which are in parallel on adsorption with the remaining bed on regeneration. In the system, feed gas from drum 9 flows downward and the regeneration gas flows upward to avoid flushing contaminants absorbed at the inlet through the bed. Filters 29, 30 and 31 serve to catch any molecular sieve particles leaving the beds. In operation, the regeneration gas is typically $260°-280°$ C., or $10°-38°$ C., above the desired bed temperature.

Liquid hydrocarbons condensed in these two exchangers and the glycol are removed from the vapour in a drum 13 and the separated vapour is expanded in the second expansion turbine 14, e.g. from 5720 to 2895 kPa. Power generated by the expansion turbine is absorbed in a compressor 15, mounted on the output shaft of the turbine 14 and driven thereby. Liquid condensed in the expansion turbine (approximately 10 Wt.%) is removed from the vapour in a drum 16 and is pumped by pump 17, combined with liquid hydrocarbons from the drum 13 and warmed in heat exchanger 11 by cooling part of the fed stream. Vapour from the drum 16 is compressed in two stages by the first compressor 15 and the second compressor 6 up to approximately 5408 kPa and is then transported to injection compressors (not shown). An inter-cooler 18 is provided between the first and second compressor 15 and 6 respectively.

Advantages of the process according to the invention are:

Significant reduction in low and medium compression horsepower by utilising expansion turbine recovered power, in a particular case an excess of 30% saving amounting to 4000 hp.

Elimination of an external refrigeration system by utilizing the second stage expansion to provide the necessary cooling energy, in a particular case saving 6200 hp of mechanical refrigeration.

Fuel gas saving through utilizing turbo-expander recovered power instead of providing additional compression power requiring significant quantities of fuel gas. In a particular case the saving achieved was in access of 4 MMSCFD.

Maintenance of expansion turbine-compressor trains is extremely simple as compared with the conventional refrigeration compressors. The rotating parts are very light and the central bearing cartridge section with both turbine and compressor rotors attached can easily be disassembled for inspection or repair. The rotating assembly cartridge can be replaced within 4 to 6 hours without need for major disassembly as compared with the 3 to 5 days required for a rotor change-out for the refrigeration compressors.

A saving in required space will result.

The weight of the turbine-compressor units is considerably less than of the motor driven compressors of the conventional process.

No gearbox and flexible couplings are necessary for the turbine-compressor units. Spare parts for these items would not have to be carried.

Figure 2:
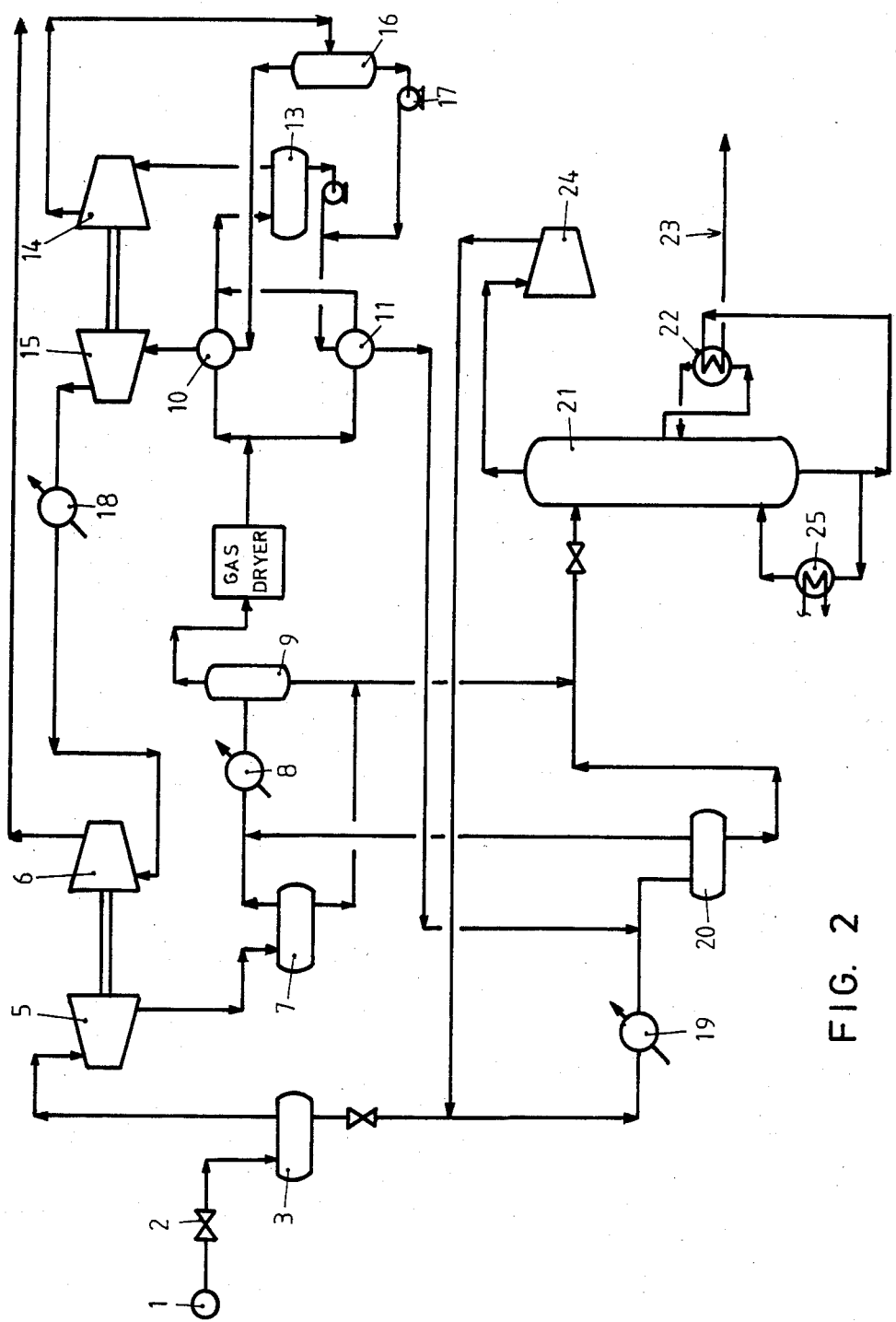

A second embodiment of the process according to the invention is illustrated in FIG. 2. The two turbine-compressor sets are retained but the condensate stabilizing consisting of flash drums and compressor is replaced by reboiler-strippers, and a significantly reduced compression system.

Liquid from inlet gas scrubber 3 is let down to 6345 kPa and combined with vapor from compressor 24 to be described later. The combined stream is cooled via water in cooler 19 and is combined with the two phase stream from Exchanger 11 and flows to MP separator 20 operating at 6200 kPa. Vapor from MP separator 20 flows to the inlet of exchanger 8. Liquid from MP separator is combined with liquids from drum 7 and 9 and is let down to stripper 21 operating at 2750 kPa. The vapor off stripper 21 is compressed by compressor 24 and joins the liquid from scrubber 3 as previously described. The bottoms from the stripper 21 flows to interreboiler 22 to provide reboiler heat to the stripper and to provide cooling of the bottoms product that is discharged via conduit 23. Additionally, reboiler 25 is provided to add supplemental reboiling duty as necessary.

Advantages of this second embodiment of the process are:

Elimination of two stages of compression resulting in a simpler process.

Reduced maintenance due to elimination of rotating machinery.

A saving in space and weight.

Utilisation of waste heat energy for reboiler duty.

Saving of fuel gas due to reduction of compression hp.

I claim:

1. A process for selectively separating gas and liquid fractions from reservoirs or other hydrocarbon gas/liquid mixtures comprising:
    passing said gas/liquid mixture through a knockout vessel;
    passing said gas/liquid mixture to an inlet gas scrubber;
    separating condensate from the gas in said inlet scrubber;
    removing said condensate from said inlet scrubber to a condensate separator;
    feeding gas/vapor mixture from said inlet scrubber to a first expansion turbine and expanding said gas/vapor mixture therein;
    absorbing power generated by said first expansion turbine in a first compressor provided on and driven by said first expansion turbine;
    feeding gas/vapor and condensate produced during expansion in said first expansion turbine to a first separatory drum;
    removing said condensate to said condensate separator;
    combining gas/vapor from said first separatory drum with vapor from said first condensate separator;
    cooling the combined vapor and gas/vapor by means of a heat exchanger;
    feeding the combined gas/vapor and condensate produced in said heat exchanger to a second separatory drum and separating gas/vapor and condensate therein;
    removing said condensate to said condensate separator;
    cooling gas/vapor from said second separatory drum in parallel second and third heat exchangers;
    removing the gas and liquid hydrocarbons from said second and third heat exchangers to a third separatory drum and separating said gas and said liquid hydrocarbons therein;
    feeding said gas to a second expansion turbine and expanding said gas therein;
    absorbing power generated by said second expansion turbine in a second compressor provided on and driven by said second expansion turbine;
    removing gas and condensate from said second expansion turbine to a fourth separatory drum and effecting separation therein;
    combining said condensate from said fourth separatory drum with said liquid hydrocarbons from said third separatory drum and moving the resultant mixture to said condensate separator in heat exchange relationship to said third heat exchangers;
    feeding gas from said fourth separatory drum to said second compressor in heat exchange relationship to said second heat exchanger and compressing said gas therein;
    feeding said compressed gas through an intercooler to said first compressor and further compressing said gas therein; and
    recovering said compressed gas.

2. In a process for selectively separating gas and liquid fractions obtained from reservoirs or other hydrocarbon gas/liquid mixtures by expansion in expansion turbines, the improvement which comprises:
    feeding the gas and liquid mixture to be separated through a knockout vessel in the absence of exterior cooling to a first expansion turbine;
    obtaining and separating condensate from said mixtures in said turbine;
    removing vapor from the separation of said mixture to a second expansion turbine;
    compressing said vapor in a first compressor provided on and driven by the shaft of said second turbine;
    further compressing said vapor in a second compressor provided on and driven by the shaft of said turbine; and
    recovering said condensate and compressed vapor products.

3. The process as defined by claim 2 wherein said condensate is separated after the expansion stages by flash vaporization.

4. The process as defined by claim 2 wherein said condensate is separated after the expansion stages by stripping-reboiling.